United States Patent [19]
Knight, Jr.

[11] Patent Number: 5,044,940
[45] Date of Patent: Sep. 3, 1991

[54] BLAST FURNACE AIR HEATER

[75] Inventor: Robert N. Knight, Jr., Southgate, Mich.

[73] Assignee: James R. Martin, Canton, Mich.

[21] Appl. No.: 597,413

[22] Filed: Oct. 15, 1990

[51] Int. Cl.⁵ .............................................. F24H 7/00
[52] U.S. Cl. ........................................ 432/30; 432/40; 432/54; 432/181; 432/222; 432/179
[58] Field of Search ................. 432/179, 180, 181, 40, 432/30, 222, 54

[56] References Cited

U.S. PATENT DOCUMENTS

| | | | |
|---|---|---|---|
| 1,619,747 | 3/1927 | Morton | 432/179 |
| 1,719,453 | 7/1929 | Ryding | 432/179 |
| 1,739,973 | 12/1929 | Mambourg | 432/181 |
| 3,082,995 | 3/1963 | Krapf | 432/40 |
| 3,122,359 | 2/1964 | MacDonald | 432/30 |
| 3,199,849 | 8/1965 | Koinis | 432/40 |
| 3,712,597 | 1/1973 | Waitkus et al. | 432/180 |
| 4,060,913 | 12/1977 | Yoshida et al. | 432/40 |
| 4,139,340 | 2/1979 | Bartel | 432/179 |
| 4,177,861 | 12/1979 | Costello et al. | 432/179 |
| 4,324,545 | 4/1982 | Hubbert | 432/222 |
| 4,944,674 | 7/1990 | Wedge et al. | 432/54 |

Primary Examiner—Henry C. Yuen
Attorney, Agent, or Firm—Charles W. Chandler

[57] ABSTRACT

An air heating apparatus for air that is to be supplied to a blast furnace. The apparatus includes a number of separate air heater devices connected together in series flow relation so that the total temperature increase is the sum of the heating actions produced in the individual devices. Each device includes a tube-shell heat exchanger and a plurality of burner units oriented around the shell to direct flames against outer surfaces of the tubes.

11 Claims, 2 Drawing Sheets

BLAST FURNACE AIR HEATER

BACKGROUND AND SUMMARY OF THE INVENTION

This invention relates to an apparatus for heating air that is to be supplied to a blast furnace.

A blast furnace is used for extracting iron from iron ore. Coke and limestone are charged through a hopper in the upper end of the furnace. Heater air is fed into the furnace through a ring of holes located near the base of the furnace. The upflowing hot air burns the coke which forms carbon monoxide that reacts with the iron ore to reduce and liquify the iron. Molten iron gravitates downwardly to the bottom of the furnace where it is periodically removed.

Air supplied to the furnace should be at 1800° F. for proper operation of the furnace. Under conventional practice the air is heated by passing it through large stoves containing refractory checkerwork. One such stove is shown in U.S. Pat. No. 3,122,359 to J. McDonald. Operation of such stoves is cyclic in nature. During part of the cycle, carbon monoxide is fed from the blast furnace to burners in the stove. The burners heat the checkerwork. In the other part of the cycle, the burners are shut down, and the air for blast furnace operation is passed through the checkerwork to extract heat previously generated in the bricks by operation of the burners. The heated air is passed from the stove to the blast furnace.

There are some disadvantages with the conventional system for heating air being supplied to a blast furnace. For example, two or three stoves must be provided for a single blast furnace (because each stove is delivering heated air to the furnace only part of the time). Also, the air coming out of the stove is usually not at a uniform temperature, due to flow variances across the checkerwork, and also due to the fact that the bricks (checkerwork) have a lesser air heating effect as they become cooler during the course of the air heating cycle.

The present invention contemplates an air heating apparatus that includes several air heater devices arranged in a series-flow relation. Each device raises the air temperature a given amount (but not necessarily the same amount for each device). The total heating effect is the sum of the heating actions of the various heater devices in the system.

A typical system comprises twelve heater devices, each heater device being effective to raise the air temperature so that the total increase is about 1200° F.

Each heater device preferably includes a tube-shell heat exchanger having three or more forced draft burner units extending radially for directing the burner flames through the shell and onto the tubes. The air is blown through the tubes, such that the heated tubes heat the flowing air. An air expansion space is formed at the outlet end of each air heater device so that a turbulent mixing of the heated air occurs each time the air leaves a given set of tubes. This mixing action tends to promote a uniform air temperature, to minimize any undesired hot or cold spots that might otherwise result due to uneven heating of the tubes by the burner.

Each heating device is independently controlled to obtain a desired air outlet temperature. The air is heated in small steps, such that effects of under heating or over heating in any one step are compensated for (corrected) by the next heating step.

A primary advantage of the heating apparatus is that it is continuous (not cyclic). Therefore it can supply the entire air heating requirements of a given blast furnace, without any down time for regeneration or reconditioning.

THE DRAWINGS

DESCRIPTION OF A PREFERRED EMBODIMENT OF THE INVENTION

Figure 1:
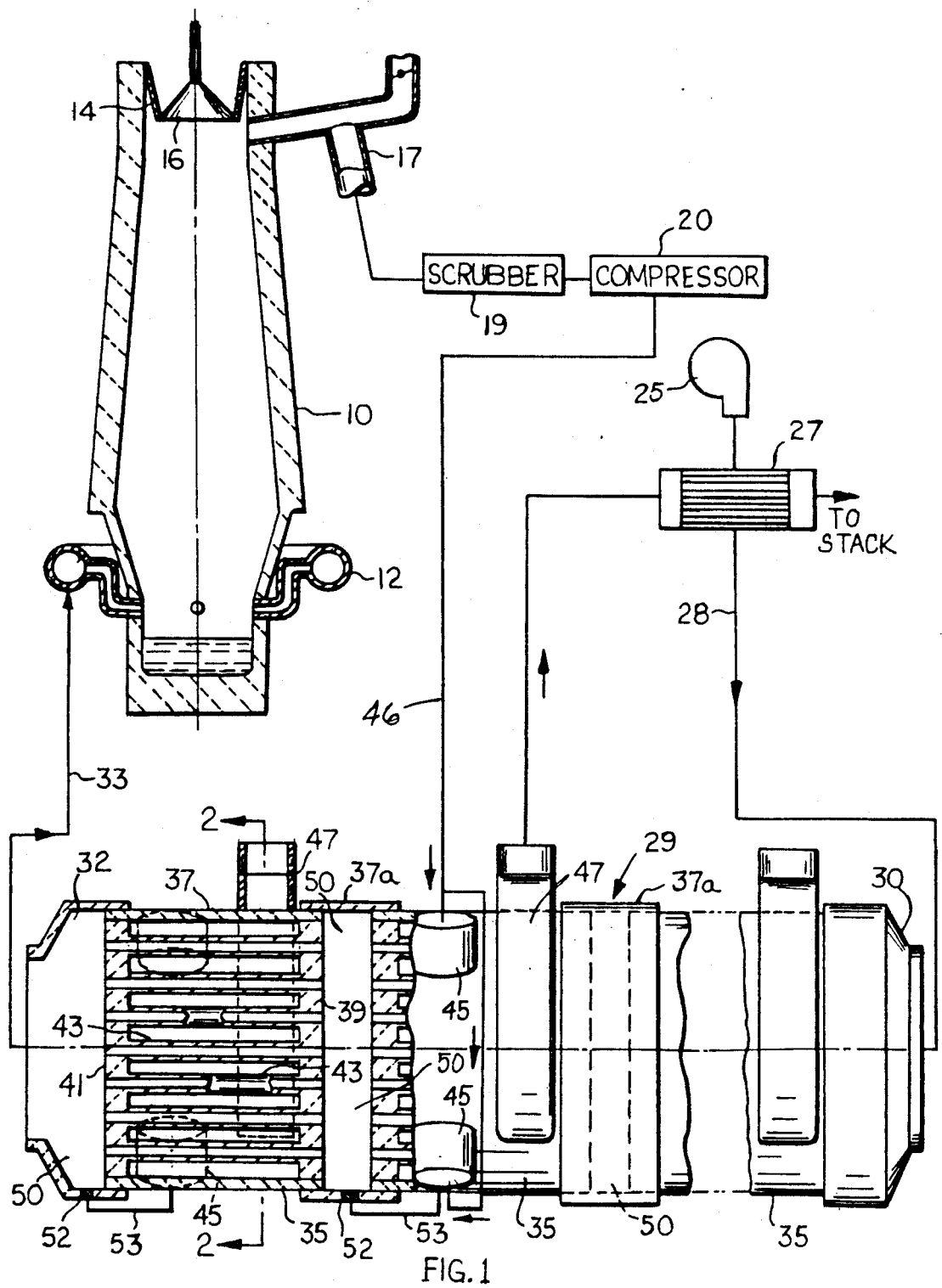
FIG. 1 shows a heating apparatus of the present invention in association with a conventional blast furnace.

FIG. 1 shows a conventional blast furnace 10, wherein heated air is supplied to the furnace through nozzles extending from an annular air supply passage 12. Coke, ore and limestone are charged into the furnace through a hopper 14 having a bell-shaped valve 16 therein. Gases containing combustible carbon monoxide are exhausted through a downcomer pipe 17 that leads to a scrubber 19 and then compressor 20.

One or more blowers 25 pass cold air through the tube side of heat exchange unit 27 where it is heated to a temperature of approximately 1000° F.

The heated air is blown through line 28 to another air heating apparatus 29 constructed according to the teachings of the present invention. Apparatus 29 raises the air temperature from about 1000° F. (at inlet 30) to about 2400° F. or as necessary (at outlet 32). The high temperature air is passed through line 33 to passage 12.

Apparatus 29 comprises a plurality of similarly constructed air heater devices arranged in series flow relation so that air heated in one device is immediately passed into another device for another heating action. Each heater device includes a heat exchanger shell and four burner units spaced around the shell periphery for directing flames into the shell interior space. The flames play against the outer surfaces of air tubes that extend axially within and through the shell structure. Air flowing through the tubes is heated by the burner-generated flames.

As heated air exits from a given set of air tubes, it moves into an expansion space having a flow cross section appreciably greater than the total cross section of the tubes. The air from different tubes undergoes a turbulent mixing action that minimizes variations in air temperature due to unevenness of the air heating action by the burner units. Each air heater device (tube-shell heat exchanger and burner unit assembly) raises the air temperature a predetermined amount. The total heating effect (between inlet 30 and outlet 32) is the sum of the individual heating effects in the individual heater devices.

One of the air heater devices is shown at 35 in FIG. 1. The device comprises a cylindrical shell 37, an upstream tube sheet 39, a downstream tube sheet 41, and a plurality of heat exchanger tubes 43 extending between the tube sheets for conducting air in a right-to-left direction (FIG. 1).

Figure 2:
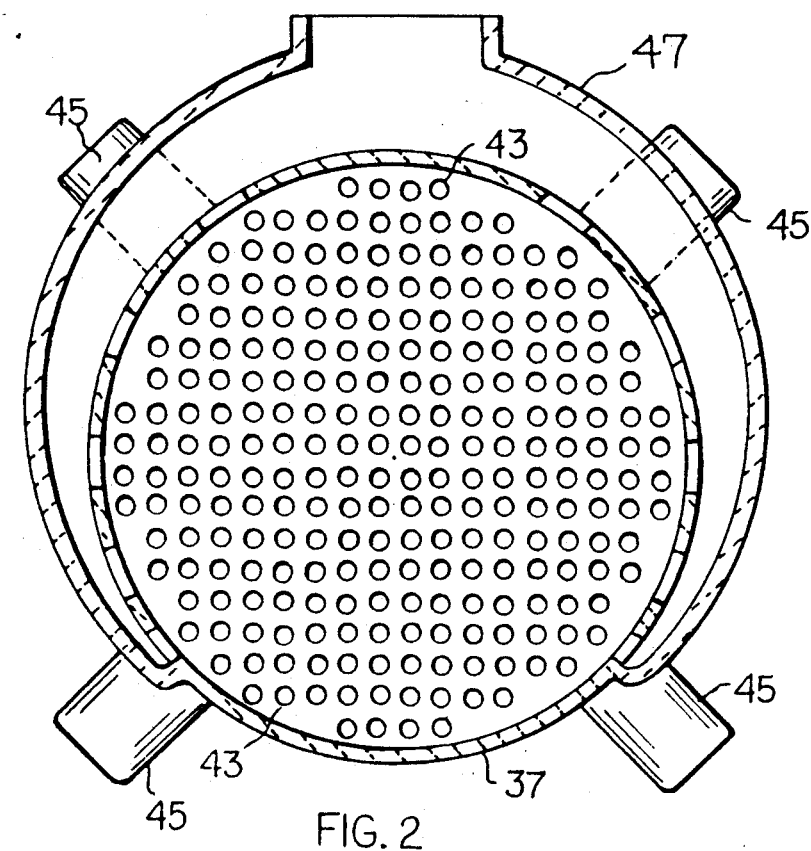
FIG. 2 is an enlarged sectional view taken essentially on line 2—2 in FIG. 1.

FIG. 2 illustrates in a more detailed fashion the number of tubes 43 employed in each air heater device (upwards of two hundred tubes). Each tube has a diameter of about seven inches and a length of about five feet. The tubes are located on twelve inch centers. Shell 37 has a diameter on the order of twenty feet.

As shown schematically in FIG. 1, there are four gas-fired or oil-fired burner units 45 oriented on radial lines to direct flames into shell structure 37 so as to impinge on air tubes 43. Burner units 45 receive compressed heated air through conduit means 46. Combustion gases are exhausted from shell 37 through a stack structure 47 and conduit means 48 to heat exchange unit 27 to recover energy by preheating cold air received from blower 25. The combustion gases pass from the heat exchange unit 27 to a stack.

Each shell 37 is connected at its upstream end to an auxiliary cylindrical shell 37a. Each shell 37a serves as a bridge from one shell 37 to a corresponding shell 37 in the adjacent heater device. The shell structures are constructed so that each heater device has an air inlet chamber 50 at its upstream end and an air outlet chamber at its other end. The outlet chamber for one heater device acts as the inlet chamber for the next heater device in the series. Numeral 50 is used in FIG. 1 to indicate the common chamber (inlet chamber for one device and outlet chamber for the preceding device). Each chamber 50 is appreciably shorter in the flow direction than the associated air tubes 43. For example, each tube 43 can have a length of about five feet, whereas the length of each chamber 50 can be about one foot.

The flow cross section of each chamber 50 (i.e. normal to the shell axis) is appreciably greater than the total flow cross section of tubes 43 (because of the tube spacing and the tube wall thickness). Typically, each chamber 50 has a cross sectional dimension that is about three times the total tube 43 cross sectional dimension. Therefore the air exiting from each set of tubes 43 experiences a sudden change in velocity that produces a turbulent mixing of the individual air masses coming out of the tubes. Even though the burner units may tend to heat tubes 43 unevenly, the air expansion (turbulence) in each associated chamber 50 mixes the air to achieve substantial air temperature uniformity across the air stream path.

Each shell 37 has a slidable connection to the associated shell 37a for the purpose of preventing thermal stresses in the shell assembly, as might lead to mechanical failure (breakage). Each tube 43 is relatively short, such that each tube sheet 39 or 41 can be affixed to the associated shell without generating undue thermal stress. Another factor in establishing low stress levels is the fact that each heater device 39 is required to achieve only a small portion of the total heating operation. For example, there may be twelve heater devices 39 in series flow relation, for achieving a total air temperature increase of about 1200° F. (e.g. from 1000° F. up to 2200° F.). Each device 39 is then required to raise the air temperature only about 100° F. Thermal stress levels can be kept relatively low in each heater device.

The burner units 45 in each heater device are preferably controlled by an air temperature responsive device that is oriented to respond to temperature change in the outlet chamber 50 of the respective heater device. Numeral 52 in FIG. 1 references a temperature sensor (pyrometer mechanism) responding to a temperature change in chamber 50 for transmitting a control signal through line 53 to the associated burner units 45. Each set of burners is controlled independently of the other burners in the system. However, by establishing different sensor settings for the different outlet chambers 50, it is possible to let one set of burners help out the preceding burners in the system. For example, if the outlet temperature in a particular heater device should be lower than design level, the sensor in the next heater device will command the burners in that device to work longer to raise the temperature to a satisfactory level.

Figure 6:
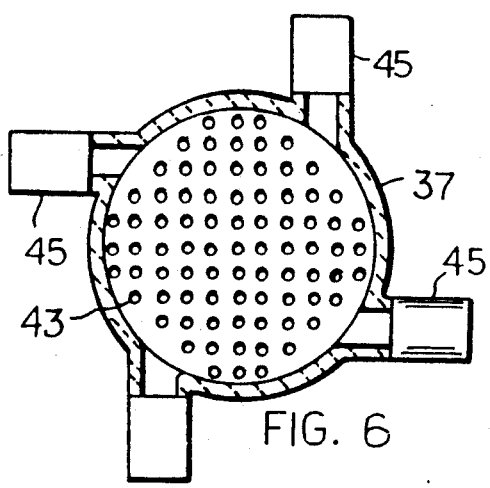
FIG. 6 is a view taken through another tube-shell heat exchanger that can be used in the practice of the invention.

FIG. 2 shows four burner units in the representative heater device 35. However, a greater number of burner units could be used. Preferably at least three burner units will be used in each air heater device. The burner units in FIG. 2 are oriented on radial lines through the shell cylinder axis. FIG. 6 shows an alternate arrangement wherein each burner unit has its axis located on a tangent to the shell circumference.

Figure 3:
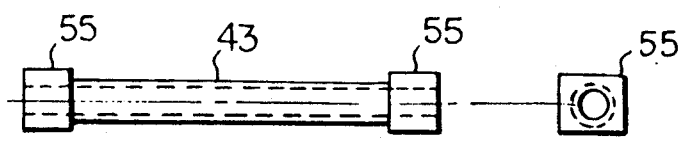
FIG. 3 is a side elevational view of a heat exchange tube used in the apparatus of FIGS. 1 and 2.
Figure 4:
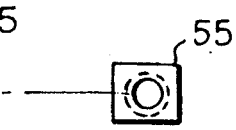
FIG. 4 is an end view of the FIG. 3 tube.

FIGS. 3 and 4 show an individual air tube 43 formed with enlarged ends 55. As shown in FIG. 4, each tube end has a square configuration. The tubes can be arranged so that the square ends 55 have their flat edges abutted together (and adhesively secured), whereby the square ends act as spacers for the tubes. In this arrangement the square tube ends form the tube sheets for mounting the tubes in the shell. Patching will however have to be added between the radially outermost tube ends and the shell inner surface.

Figure 5:
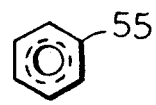
FIG. 5 is a view taken in the same direction as FIG. 4, but showing a different end flange configuration that can be used.

The tubes can be formed of different materials, depending on the temperatures to which the tubes are subjected. The tubes at the upstream end of the apparatus (where the temperatures are lowest) could be formed of steel. Tubes at the downstream (left) end of the apparatus must be formed of a temperature-withstanding material, e.g. magnesium oxide or silicon carbide. FIG. 5 shows an alternate tube end configuration, i.e. hexagonal. The flat faces on each hexagon can fit against corresponding flat faces of adjacent hexagonal tube ends to form a tube sheet.

The number of air heater devices 35 can be varied, depending on the total air temperature increase needed to be achieved by the apparatus, and also depending on the number and size of the burner units 45 used in each air heater device. In most cases it is contemplated that at least six air heater devices will be used.

What is claimed is:

1. Apparatus for heating air to be used in a blast furnace; said apparatus comprising a plurality of similarly constructed air heater devices arranged in series flow relation; each device being operable to raise the air supplied thereto from a given inlet temperature to a given outlet temperature, whereby the apparatus is enabled to raise the air temperature from the air inlet temperature at the first air heater device to the air outlet temperature at the last air heater device;

each air heater device comprising a tube-shell heat exchanger that includes a shell structure, two spaced tube sheets, and a series of heat exchange tubes extending between said tube sheets; said shell structure having a greater axial length than the tubes so that an air expansion space is formed within the shell structure in communication with opposite ends of the tubes; one of said expansion spaces constituting an air inlet chamber for the air heater device, and the other expansion space constituting an air outlet chamber for the air heater device; and a plural number of forced draft burner units spaced around said shell structure for directing flames into the shell structure generally normal to the tubes, whereby said tubes, are heated to thus heat the air flowing through the tubes and ultimately to said blast furnace.

said air heater devices being interconnected so that the air outlet chamber for a given air heater device serves as the air inlet chamber for the next air heater device.

2. The apparatus of claim 1, wherein the tubes in each air heater device are appreciably longer than the axial length of each associated air expansion space.

3. The apparatus of claim 1, wherein the flow cross section of each air expansion space is appreciably greater than the total flow cross section of the associated tubes.

4. The apparatus of claim 3, wherein the flow cross section of each air expansion space is approximately three times the total flow cross section of the associate tubes.

5. The apparatus of claim 4, wherein each shell structure has a cylindrical cross section; said burner units being oriented on the shell structure to direct flames toward the cylinder axis.

6. The apparatus of claim 1, wherein the tubes and tube sheets in each air heater device are integral with each other; each tube having a substantially circular cross-section with radially enlarged ends having an equi-angular polygon configuration, said enlarged ends having flat edges thereof adapted to abut together to space the tubes apart on a common tube spacing.

7. The apparatus of claim 1, wherein there are at least six air heater devices.

8. The apparatus of claim 1, further comprising means for controlling the burner units in each air heater device; each controlling means including means responsive to air temperatures within the associated outlet chamber.

9. The apparatus of claim 1, wherein each air expansion space is completely vacant, whereby appreciable air turbulance is generated as air moves out of a heat exchange tube into an associated expansion space.

10. The apparatus of claim 1, wherein each shell structure has a generally cylindrical configuration, the diameter of each shell structure being greater than the length of each associated heat exchange tube.

11. The apparatus of claim 1, wherein there are at least six air heater devices; and including means for independently controlling the burner units in each air heater device so that the heating action of each device is unaffected by the heating action of any other device; each controlling means comprising a temperature sensor responsive to the air temperature in the outlet chamber of the respective air heater device.

* * * * *